(12) United States Patent
Smirnov

(10) Patent No.: US 8,196,601 B2
(45) Date of Patent: Jun. 12, 2012

(54) THERMAL FLOW SENSOR WITH ZERO DRIFT COMPENSATION

(75) Inventor: Alexei V. Smirnov, Fort Collins, CO (US)

(73) Assignee: Hitachi Metals, Ltd, Tokyo (JP)

( * ) Notice: Subject to any disclaimer, the term of this patent is extended or adjusted under 35 U.S.C. 154(b) by 500 days.

(21) Appl. No.: 12/494,970

(22) Filed: Jun. 30, 2009

(65) Prior Publication Data

US 2010/0326539 A1 Dec. 30, 2010

(51) Int. Cl.
*F16K 17/38* (2006.01)
(52) U.S. Cl. ............ 137/468; 137/486; 73/204.15
(58) Field of Classification Search ............ 137/2, 12, 137/468, 486, 487, 487.5; 73/204.13, 204.15, 73/204.19
See application file for complete search history.

(56) References Cited

U.S. PATENT DOCUMENTS

| | | | | |
|---|---|---|---|---|
| 4,686,856 A | * | 8/1987 | Vavra et al. | 73/204.15 |
| 4,984,460 A | * | 1/1991 | Isoda | 73/204.15 |
| 5,062,446 A | * | 11/1991 | Anderson | 137/468 |
| 5,410,912 A | * | 5/1995 | Suzuki | 73/204.15 |
| 5,461,913 A | * | 10/1995 | Hinkle et al. | 73/204.15 |
| 6,318,171 B1 | | 11/2001 | Suzuki | |
| 2003/0115951 A1 | | 6/2003 | Ambrosina et al. | |
| 2008/0211510 A1 | | 9/2008 | Zolock et al. | |
| 2010/0080262 A1 | | 4/2010 | McDonald | |
| 2010/0089459 A1 | | 4/2010 | Smirnov et al. | |

FOREIGN PATENT DOCUMENTS

JP 2096619 4/1990

OTHER PUBLICATIONS

Howell, Steven, "International Search Report and Written Opinion of the International Searching Authority, or the Declaration", Aug. 20, 2010, Published in: PCT.
Nickitas-Etienne, Athina, "International Preliminary Report on Patentability and Written Opinion re Application No. PCT/US10/039848", Jan. 4, 2012, p. 9, Published in: CH.

* cited by examiner

*Primary Examiner* — Eric Keasel
(74) *Attorney, Agent, or Firm* — Neugeboren O'Dowd PC; Sean R. O'Dowd

(57) ABSTRACT

One embodiment of the present invention comprises a thermal flow sensor having a first capillary tube coupled to a mass flow controller main flow line across a mass flow controller bypass. A first pair of sensing elements is coupled to the first capillary tube. The thermal sensor also comprise a second capillary tube having a substantially similar cross-sectional area to the first capillary tube, a first end thermally coupled to one of a mass flow controller base and the first tube proximal the first tube inlet port, and a second end thermally coupled to one of the mass flow controller base and the first tube proximal the outlet port. The second tube is not adapted to receive and eject a fluid flow. A second pair of sensing elements is coupled to the second tube.

20 Claims, 4 Drawing Sheets

THERMAL FLOW SENSOR WITH ZERO DRIFT COMPENSATION

FIELD OF THE INVENTION

The present invention generally relates to thermal flow sensors. In particular, but not by way of limitation, the present invention relates to mass flow controller thermal sensors and methods for operating the same.

BACKGROUND OF THE INVENTION

A typical mass flow controller (MFC) is a device configured and adapted to control the delivery of a fluid. A specified delivery rate of fluid may be set by a user in terms of, for example, cubic centimeters or grams of fluid delivered from the MFC per minute. In order to control the flow rate of fluid delivered from the MFC, a typical MFC generates an output signal which is indicative of the actual flow rate of the MFC. This actual flow rate is compared to the user-specified flow rate and a control valve is adjusted, if necessary, to modify the flow so that the flow of the fluid released from the MFC is released at the specified delivery rate.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention provide for mass-flow-controller-related devices and methods for operating the same. One embodiment for example, comprises a mass flow controller comprising a thermal sensor that is adapted to produce a flow rate output which is not affected by thermal gradients. The thermal sensor in this embodiment is adapted to substantially remove any zero offset in the mass flow controller (MFC) output. For example, the thermal sensor may substantially remove zero offset due to an internal source such as a non-symmetrical thermal insulator inside the sensor. In some embodiments, a glass-wool thermal insulator material may fill the space between sensing elements, capillary tube(s), and a sensor housing/cover. In some thermal sensors, the insulator material may be unevenly distributed, creating a non-uniform insulator density proximal the capillary tubes and sensing elements. This non-uniformity of insulator material may result in varying heat dissipation from the sensing elements, which may cause a difference in temperatures of the sensing elements at a zero-flow condition. This sensing element temperature difference may thus result in unbalanced element signals, producing an erroneous zero offset signal.

The thermal sensor may substantially remove zero offset due to an external source as well. For example, non-uniform temperature distribution and heat flow outside of the sensor housing may cause a difference in sensing element temperatures at zero flow. Other external sources such as, but not limited to, heat sources on a circuit board, air flow over the housing, and microscopic gas leaks may also cause a zero offset. These external sources may cause non-uniform temperature distribution around the sensor housing, creating non-uniform sensor heat dissipation from the sensing elements, resulting in a zero offset signal. Unlike most internal sources, many external sources vary with time and cannot be adjusted at a manufacturing stage or otherwise. The thermal sensor, MFC, and method described herein may remove a zero offset due to these internal and/or external sources.

One thermal sensor adapted to remove a zero offset comprises a base, a first capillary tube, a first pair of sensing elements coupled to the first capillary tube, a second capillary tube, and a second pair of sensing element coupled to the second capillary tube. One first capillary tube is adapted to allow a flow of fluid through the tube to and from the main flow line of the mass flow controller. The tube inlet and outlet ports are coupled to the MFC main flow line across a MFC bypass. Furthermore, the first pair of sensing elements are coupled to the first tube. In one embodiment, the second capillary tube is comprised of a substantially similar cross-sectional area to the first capillary tube. The second capillary tube has a first end thermally coupled to one of a MFC base and the first tube, proximal a first tube inlet port. The second tube is also comprised in one embodiment of a second end thermally coupled to one of the base and the first tube proximal a first tube outlet port. Although the second capillary tube is configured similarly to the first capillary tube, the second capillary tube is not adapted to receive and eject a fluid flow. The second pair of sensing elements is configured substantially similar to the first pair of sensing elements, with the second pair of sensing elements coupled to second tube generally opposite of the first pair of sensing elements.

Another illustrative embodiment of the invention is a method of operating a mass flow controller. In one method, fluid flows through a first capillary tube comprising a first pair of sensing elements. A thermal gradient is then received across the first pair of sensing elements and across a second pair of sensing elements that are coupled to a second capillary tube. Finally, a mass flow rate signal is output, with the mass flow rate signal being substantially unaffected by the thermal gradient.

Other embodiments of the invention comprise a mass flow controller. In one embodiment, the mass flow controller comprises a base, a main flow line, a thermal sensor, and a differential amplifier. The main flow line comprises a bypass and is adapted for a fluid flowing through the main flow line at a specified flow rate. The thermal sensor comprises a first capillary tube and a second capillary tube. The first capillary tube is comprises of an inlet end adapted to receive the fluid from the main flow line upstream of the bypass, a first pair of sensing elements adapted to output at least one first signal, and an outlet end adapted to exit the fluid to the main flow line downstream of the bypass. The second capillary tube is comprised of a first end thermally coupled to one of the base and the first capillary tube proximal the inlet end, a second pair of sensing elements adapted to output at least one second signal, and a second end thermally coupled to one of the base and the first tube proximal the outlet end. The differential amplifier is adapted to receive the at least one first signal and second signal, and output a differential amplifier signal generally proportional to the flow rate of the fluid flowing through the main flow line. However, the differential amplifier signal is not affected by temperature gradients.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
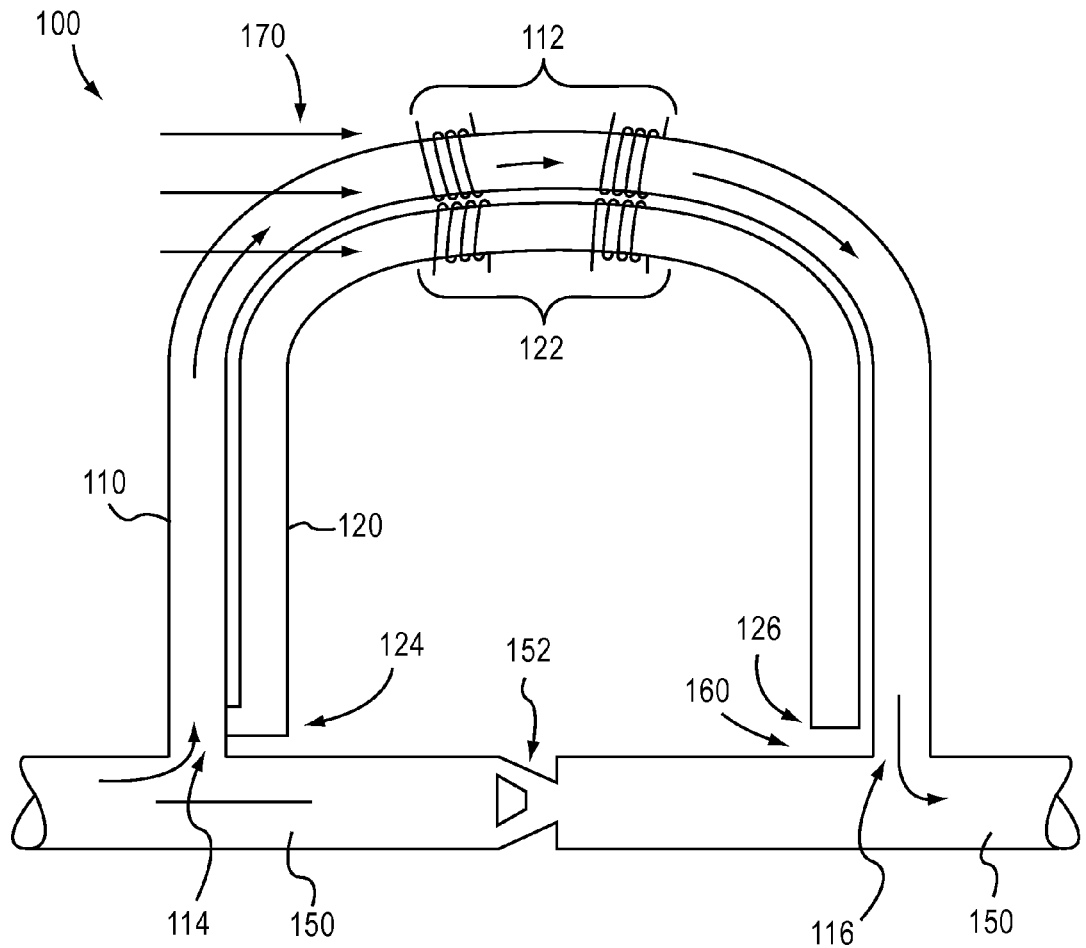
FIG. 1 is a view of a mass flow controller thermal sensor coupled to a main flow line of a mass flow controller in accordance with an illustrative embodiment of the invention.

Referring now to the drawings, where like or similar elements are designated with identical reference numerals throughout the several views where appropriate, and referring in particular to FIG. 1, shown is a mass flow controller thermal sensor 100 in accordance with an illustrative embodiment of the invention. One embodiment of the thermal sensor 100 comprises a first capillary tube 110 and a first pair of sensing elements 112. One embodiment is also comprised of a second capillary tube 120 and a second pair of sensing elements 122.

The first capillary tube is comprised of a tube inlet port 114 adapted to receive a fluid flow from a MFC main flow line 150 and a tube outlet port 116 adapted to eject a fluid flow to the main flow line 150. In one embodiment, the tube inlet and outlet ports 114, 116 are coupled or integrated to the mass flow controller main flow line 150 across a mass flow controller bypass 152.

The second capillary tube 120 in one embodiment is comprised of a cross-sectional shape that is substantially similar to a cross-sectional shape of the first capillary tube 110. For example, as shown in FIG. 1, the cross-sectional shape of the first and second tubes 110, 120 may be generally U-shaped, with the second tube 120 being located proximal to an inside-edge of the first tube 110. In many embodiments, the two tubes are located in close proximity to each other. The second tube 120 may also be placed near an outside edge of the first tube 110, or may not generally mimic the shape of the first tube 110. In the embodiment shown in FIG. 1, the second capillary tube 120 is comprised of a first end 124 thermally coupled to the first tube 110 proximal the first tube inlet port 114 and a second end thermally coupled to a base 160. However, either end 124, 126 of the second tube 120 may be thermally coupled to the base 160 or the first tube ends 114, 116. Furthermore, as seen by FIG. 1, the ends 124, 126 of the second tube 120 may be not be open ends adapted to receive a fluid flow from the main flow line 150, like the first tube ends 114, 116. The second tube ends 124 126 may be closed ends having no fluid flow there between. Furthermore, one embodiment may be comprised of a second tube 120 having a fluid located therein. However, due to the closed ends 124, 126, the fluid may be contained by and enclosed by the tube 120.

In one embodiment, the first tube sensing elements 112 may be a pair of thermal sensing coils wherein each coil may be adapted to emit a signal generally proportional to the coils temperature. Similarly, the second tube's sensing elements 122 may also be a pair of thermal sensing coils that are each adapted to emit a signal generally proportional to the coil's temperature. Like the similarity of the second tube's 120 U-shape configuration and the placement as compared to the first tube 110, the second pair of sensing elements 122 may be configured and coupled to the second tube 120 in one embodiment in a manner and location substantially similar to the first pair of sensing elements 112 being coupled to the first tube 110, as seen in FIG. 1. For example, the second pair of sensing elements 122 may substantially oppose the first pair of sensing elements 112. By placing the second pair of sensing elements 122 substantially opposite the first pair of sensing elements 112, the signal from the second pair of sensing elements may be adapted to cancel any change in temperature recorded by the first pair of sensing elements 112 due to a temperature gradient such as, but not limited to the temperature gradient 170 seen in FIG. 1. As shown below, this may occur in the bridge circuit 230 or differential amplifier 236 since the temperature gradient 170 may affect each pair of sensing elements 112, 122 in a substantially similar manner.

Figure 3:
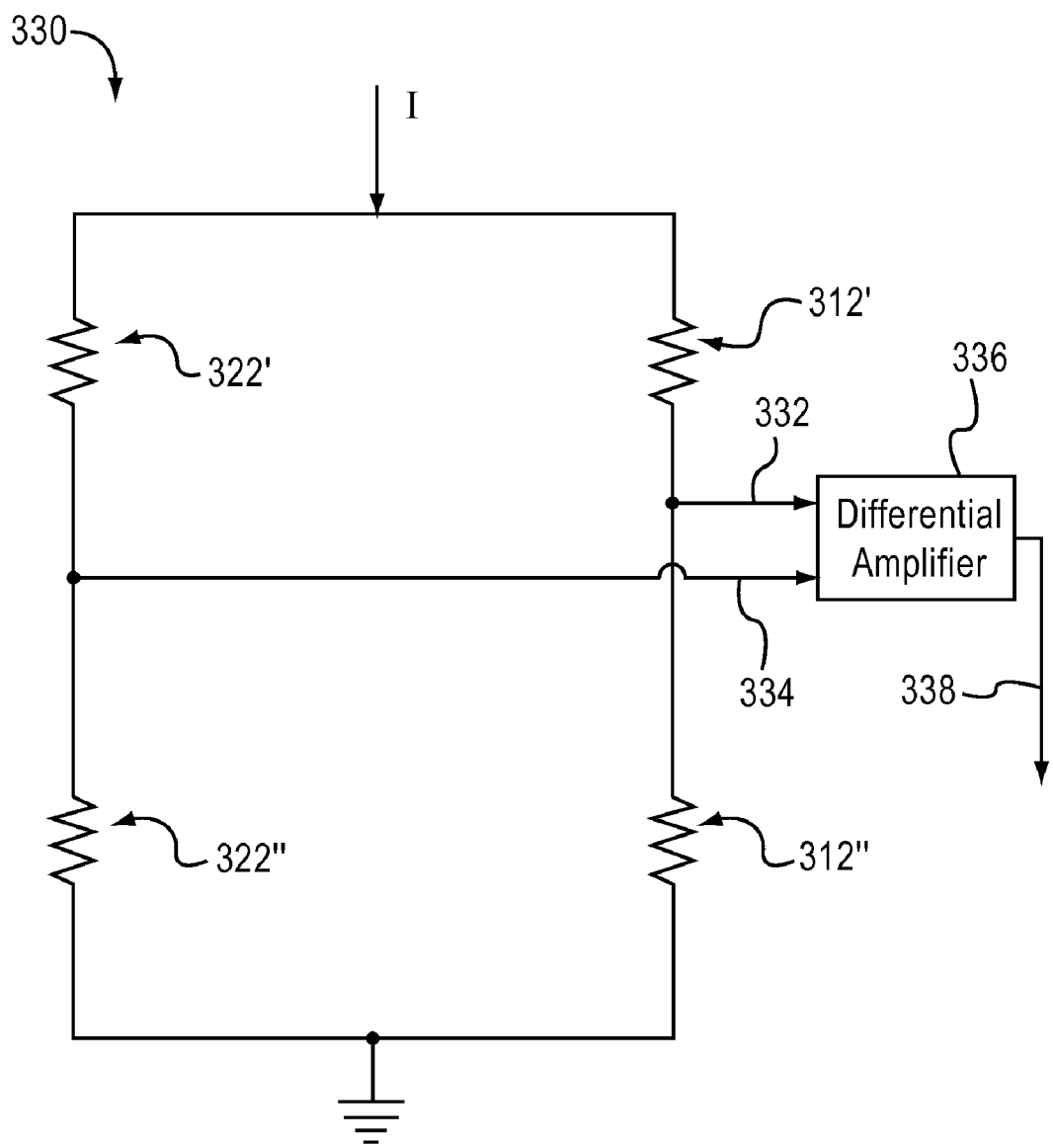
FIG. 3 is a representation of a mass flow controller bridge circuit and differential amplifier in accordance with an illustrative embodiment of the invention.

Turning now to FIG. 3, shown is a representation of a bridge circuit 330. FIG. 3 shows, for example, how the first pair of sensing elements 112 in FIG. 1, depicted as elements 312', 312", are adapted to use a bridge circuit 330 to emit a first signal 332 to a differential amplifier 336. In FIG. 3, the first signal 332 is shown as being sent from one leg of the bridge circuit 330 and the first pair of thermal sensing elements 312', 312". As the first pair of sensing elements 312', 312" change in temperature, the value of the signal 332 sent from the bridge 330 to the differential amplifier 336 changes. Similarly, the second pair of sensing elements 122 are represented in the bridge circuit 330 of FIG. 3 as elements 322' and 322". The second sensing element pair 322' and 322" provide a second signal 334 to the differential amplifier 336 from the bridge circuit 330. Like the first signal 332, the value of the second signal 334 varies as the temperature difference between the two elements 322', 322" varies.

By introducing the second sensing element pair 322', 322" to the bridge circuit in the positions represented in FIG. 3, one embodiment of the invention minimizes the effect that a thermal gradient 170, as shown in FIG. 1, has on the differential amplifier signal 338 that is output by the differential amplifier 336. For example, in some embodiments, a thermal gradient 170 may induce a temperature difference between the first sensing element pair 112. This temperature difference may be characterized as a zero-offset because at a zero flow, the sensing elements 312', 312" may still output a signal 332 reading a positive or a negative fluid flow in the first capillary tube 110, due to the change in temperature induced from the gradient 170.

In order to counteract this zero offset, the second capillary tube 120 is introduced to the thermal sensor 100 as a no-flow tube. In a no-flow tube, the only difference in temperatures between the second sensing element pair 122 is due to thermal gradients 170 (e.g., since there is no flow, there can be no temperature difference between the sensors that is due to flow). Therefore, the second signal 334 comprises a value representative of the zero-offset value. Contrastingly, the first signal 332 is comprised of a value representative of the zero-offset value combined with the difference in sensor temperatures due to the fluid flow in the first tube 11 0.

Figure 2:
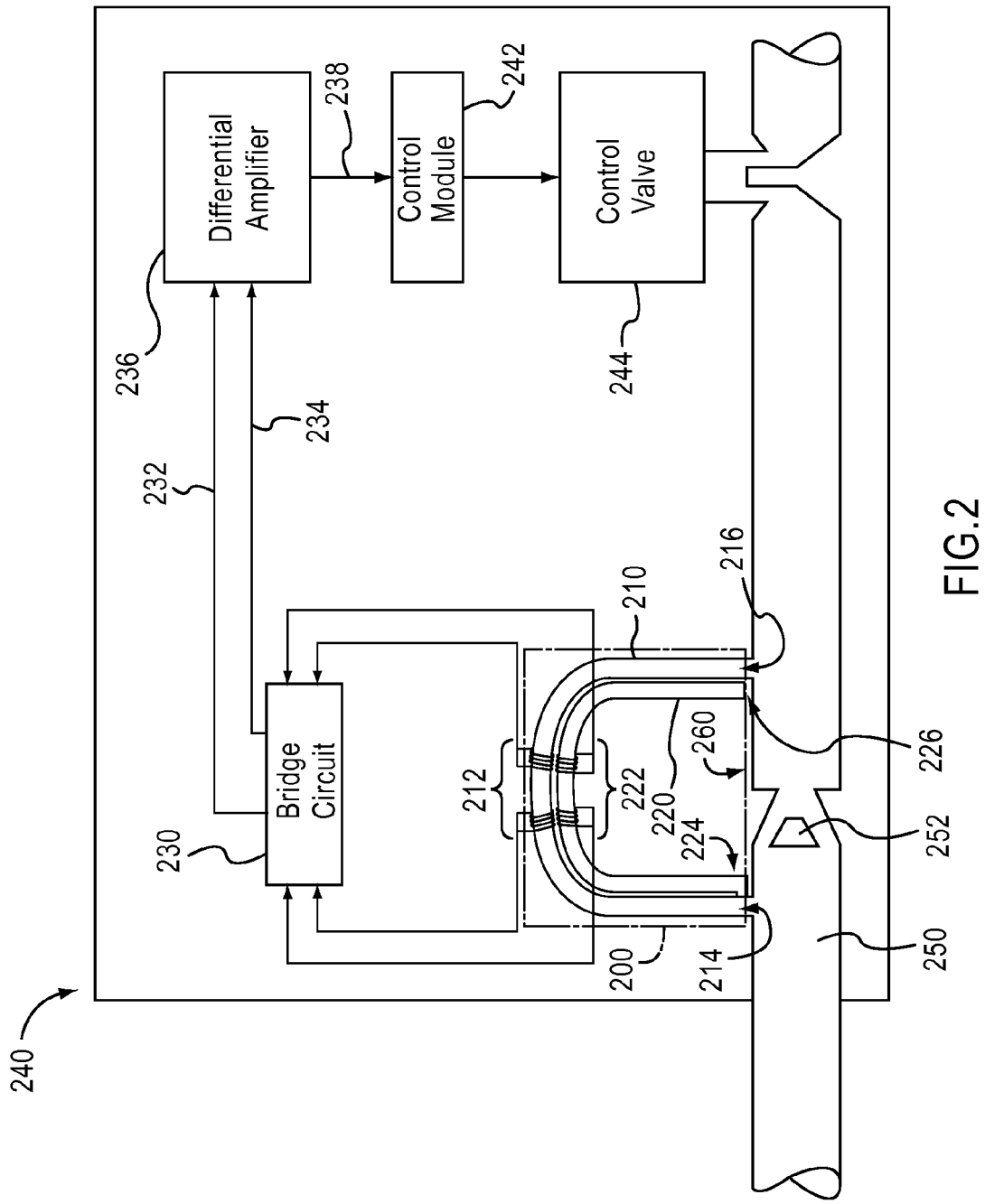
FIG. 2 is a schematic representation of a mass flow controller in accordance with an illustrative embodiment of the invention.

The differential amplifier 336 is essentially adapted in one embodiment to receive the first signal 332 and second signal 334, and use the signals to produce a differential amplifier signal 338. One differential amplifier signal 338 such as, but not limited to, a voltage, may be generally proportional to the flow rate of a fluid flowing through the main flow line 150 of a mass flow controller 240, as shown in FIG. 2. The differential amplifier 336 is adapted to take into account any change in temperature due to the thermal gradient 170 as evidenced by the second signal 334. The differential amplifier output 338 therefore automatically modifies the output from the first and second thermal sensing element pairs 112, 122 to account for a change in temperature in the pairs 112, 122 due to any thermal gradient. As such, the differential amplifier output 338 is generally proportional to a flow rate of the fluid flowing through the first capillary tube 110. The differential amplifier output 338 is therefore not affected by thermal gradients 170.

Turning to FIG. 2, shown is a mass flow controller 240 comprising a base 260, a main flow line 250 comprising a bypass 252 and adapted to receive a fluid flowing through the main flow 250 line at a specified flow rate. Furthermore, the mass flow controller 240 comprises a thermal sensor 200. The thermal sensor 200 may include a first capillary tube 210 having an inlet end 214 adapted to receive the fluid from the main flow line 250 upstream of the bypass 252. A first pair of sensing elements 212 adapted to output a first signal 232 may be coupled to the first tube. Additionally, the first tube 210 may comprise an outlet end 216 adapted to exit the fluid to the main flow line 250 downstream of the bypass 252. The thermal sensor 200 of FIG. 2 is also comprised of a second capillary tube 220 having a first end 224 thermally coupled to one of the base 260 and the first capillary tube 210, proximal the inlet end 214. A second pair of sensing elements 222 adapted to output a second signal 234 are coupled to the second tube 210 in FIG. 2, and the second tube 220 further comprises a second end 226 thermally coupled to one of the base 260 and the first tube 210 proximal the outlet end 224. Also, the mass flow controller 240 may also comprised of a differential amplifier 236 adapted to receive the first and second signal 232, 234 and output a differential amplifier signal 238. One differential amplifier signal 238 is generally proportional to the flow rate of the fluid flowing through the main flow line 150 and is substantially unaffected by thermal temperature gradients such as, but not limited to, the gradient 170 shown in FIG. 1.

As seen in the mass flow controller 240 of FIG. 2, the second capillary tube 210 may be comprised of closed ends 224, 226 that are not adapted to receive and eject a fluid from the main flow line 250. Furthermore, one embodiment of a mass flow controller 240 comprises a second tube 210 which has a fluid contained therein. The fluid may be the same or a similar fluid as the fluid flowing through the main flow line 150 and first capillary tube 210.

In one embodiment of a mass flow controller 240, the first signal 232 produced by the first pair of sensing elements 212 is generally proportional to a first flow rate wherein the first flow rate comprises the rate of the fluid flowing through the main flow line 150. However, a portion of the first signal 232 may also comprised of a false flow rate due zero drift induced from the thermal gradient 170. The second signal 234 is generally proportional to the zero drift portion of the first flow rate. In such an embodiment, the differential amplifier 236 may be able to use the two signals to produce a differential amplifier signal 238 proportional to a flow rate of the fluid in the main line 150 of the MFC 240 which is not affected by thermal gradients 170.

In order for the second thermal sensing elements 222 to work properly, in one embodiment the second pair of sensing elements 222 are coupled to the second tube 220 substantially opposingly to the first pair of sensing elements 212. Furthermore, the two pair of sensing elements 212, 222 are coupled proximal each other in a manner adapted to allow any change in temperature from the thermal gradient in the first pair of sensing elements 212 to equal the change in temperature across the second pair of sensing elements 222. Therefore, the change in temperature in the second pair may cancel out the first pair in the differential amplifier 236.

As seen in FIG. 2, one embodiment of a mass flow controller 240 may also include a control module 242 and a control valve 244. The control module 242 is adapted to receive the differential amplifier signal 238 from the differential amplifier 236 and output a signal to the control valve 244. The signal output to the control valve 244 as adapted to adjust the control valve so that the flow rate of fluid through the main flow line 250 substantially equals a user-specified flow rate of fluid.

Figure 4:
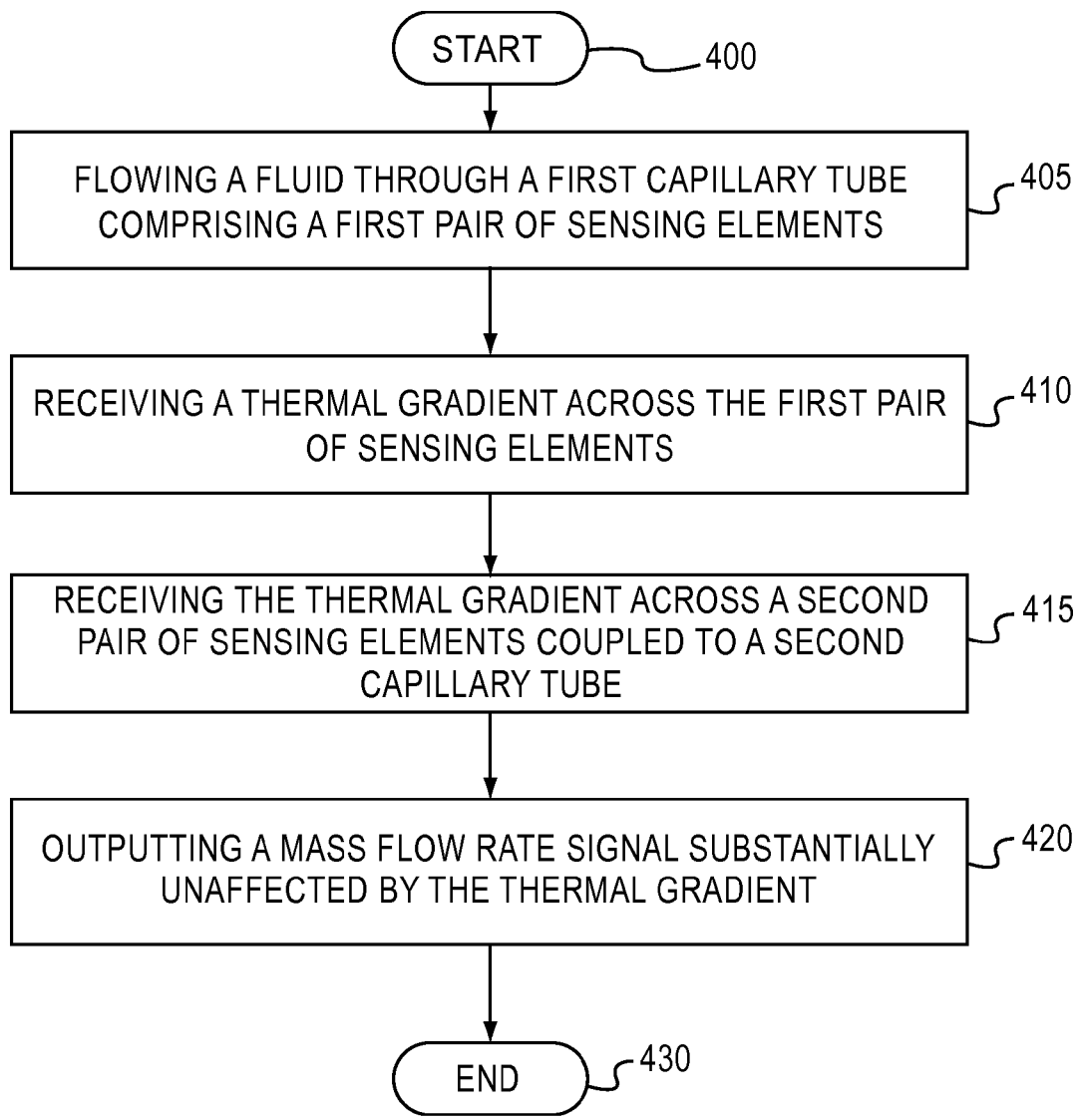
FIG. 4 is a flow chart of a method of operating a mass flow controller thermal sensor in accordance with an illustrative embodiment of the invention.

Turning to FIG. 4, shown is a method of operating a mass flow controller 240. Although reference is made to FIG. 2, it should be recognized that the method described with reference to FIG. 4 is not limited to the exemplary embodiment depicted in FIG. 2. As depicted, at 405, one method comprises flowing a fluid through a first capillary tube 210 comprising the first pair of sensing elements 212. At 410, the method comprises receiving a thermal gradient 170 and flow across the first pair of sensing elements 212, while at 415, the method comprises receiving the thermal gradient 170 across the second pair of sensing elements 222 that is coupled to the second capillary tube 220. Finally, in the method of FIG. 4, at 420, the method is comprised of outputting a mass flow rate signal substantially unaffected by the thermal gradient 170. In one method, the mass flow rate signal comprises the differential amplifier signal 238.

In one method, the thermal gradient 170 of method steps 410 and 415 induces a change in temperature across the first pair of sensing elements 212 and the second pair of sensing elements 222. The change in temperature across the second pair of sensing elements 222 may be substantially equal to the change in temperature across the first pair of sensing elements 212.

Furthermore, some methods may include additional steps such as, but not limited to, providing or generating from the first pair of sensing elements 212 a first signal 232. The first signal 232 may comprise a signal level which is generally proportional to a first mass flow rate corresponding to the mass flow rate through the first capillary tube 210. A method may also comprise providing or generating from the second pair of sensing elements 222 a second signal comprising a second signal level which is generally proportional to a zero offset of the mass flow rate. The two signals may be received by a differential amplifier 236.

For example, in one embodiment, no fluid flows through the second capillary tube 220 due to the tube 220 having closed ends 124, 126 as seen in FIG. 1. Therefore, even though the tube may be filled with fluid, the only signal emitting from the second sensing element pair 222 would be due to the thermal gradient 170 seen in FIG. 1. This thermal gradient (or gradients, as the case may be) may comprise a zero offset as the first and second thermal sensing elements may record a change in temperature at zero flow due to the thermal gradient 170. This offset is present in all signals emitted from the two sensing element pairs 212, 222. In such a method, a final step may be included of adjusting the signal level of the first signal 232 one of up and down an amount substantially equal a second signal level. However, in other methods, the first signal may be adjusted up or down an amount different than the amount of the second signal level. For example, the second signal level may be determined, and based on this level, further process of the first and/or second signals may occur by firmware, software, and/or hardware, and upon completion of this processing, a first signal level adjustment amount may be determined. Through adjustment of the first signal level, a mass flow rate may be output by the differential amplifier 236 that is substantially unaffected by the thermal gradient 170.

In conclusion, embodiments of the present invention provide, among other things, a method and apparatus for zero drift compensation in a mass flow controller. Those skilled in the art can readily recognize that numerous variations and substitutions may be made in the invention, its use, and its configuration to achieve substantially the same results as achieved by the embodiments described herein. Accordingly, there is no intention to limit the invention to the disclosed illustrative forms. Many variations, modifications, and alternative constructions fall within the scope and spirit of the disclosed invention as expressed in the claims.

What is claimed is:

1. A thermal flow sensor comprising,
    a first capillary tube having,
        a tube inlet port adapted to receive a fluid flow, and
        a tube outlet port adapted to eject a fluid flow, the tube inlet and outlet ports being adapted to couple to a mass flow controller main flow line across a mass flow controller bypass;
    a first pair of sensing elements coupled to the first capillary tube;
    a second capillary tube having,
        a substantially similar cross-sectional shape to the first capillary tube,
        a first end thermally coupled to one of a mass flow controller base and the first tube proximal the inlet port, the first end comprising a closed end, and
        a second end thermally coupled to one of the mass flow controller base and the first tube proximal the outlet port, the second end comprising a closed end; and
    a second pair of sensing elements substantially similar to the first pair of sensing elements, the second pair of sensing elements coupled to the second tube generally opposite of the first pair of sensing elements.

2. The thermal flow sensor of claim 1 wherein,
    the first pair of sensing elements is adapted to emit a signal generally representing a difference in temperature between the first pair of sensing elements, wherein the difference in temperature between the first pair of sensing elements comprises a change in temperature due to a fluid flowing through in the first capillary tube and a thermal gradient; and
    the second pair of sensing elements is adapted to emit a signal representing a difference in temperature between the second pair of sensing elements, wherein the difference in temperature between the second pair of sensing elements comprises a change in temperature due to the thermal gradient.

3. The thermal flow sensor of claim 2 further comprising a bridge circuit, wherein the first pair of sensing elements is one leg of the bridge circuit and the second pair of sensing elements is another leg of the bridge circuit.

4. The thermal flow sensor of claim 1 further comprising, a differential amplifier adapted to (i) receive at least one signal from the first and second pair of sensing elements, and (ii) output a differential amplifier signal comprising a voltage generally proportional to a flow rate of the fluid flowing through the first capillary tube.

5. The thermal flow sensor of claim 1 wherein,
    a fluid is enclosed by the second capillary tube; and
    the fluid does not flow through the ends of the second capillary tube.

6. The thermal flow sensor of claim 1 wherein, the second pair of sensing elements are arranged to cancel any change in temperature recorded by the first pair of sensing elements, wherein the change in temperature is comprised of a thermal gradient change in temperature.

7. A method of operating a mass flow controller comprising,
    flowing a fluid through a first capillary tube comprising a first pair of sensing elements;
    receiving a thermal gradient across the first pair of sensing elements;
    receiving the thermal gradient across a second pair of sensing elements coupled to a second capillary tube without receiving and ejecting the fluid through the second capillary tube; and
    outputting a signal substantially proportional to a mass flow rate, wherein the signal is substantially unaffected by the thermal gradient;
    wherein one end of the second capillary tube is open to allow the fluid to enter the second capillary tube, and another end of the second capillary tube is closed to prevent the fluid from being ejected through the second capillary tube.

8. The method of claim 7 wherein,
    the thermal gradient induces a change in temperature across the first pair of sensing elements;
    the thermal gradient induces a change in temperature across the second pair of sensing elements, the change in temperature across the second pair of sensing elements being substantially equal to the change in temperature across the first pair of sensing elements.

9. The method of claim 7 further including,
    providing from the first pair of sensing elements a first signal corresponding to the first capillary tube mass flow rate;
    providing from the second pair of sensing elements a second signal corresponding to a mass flow rate zero offset; and
    adjusting a signal level of the first signal one of up and down in order to output a mass flow rate substantially unaffected by the thermal gradient.

10. The method of claim 9 wherein, the adjustment of the first signal level comprises an adjustment substantially equal to a signal level of the second signal.

11. The method of claim 7 further comprising,
    generating a first signal, the first signal generated by the first pair of sensing elements;
    generating a second signal, the second signal generated by the second pair of sensing elements; and
    receiving the first and second signals at a differential amplifier.

12. The method of claim 7, wherein the second capillary tube is thermally coupled to the first capillary tube.

13. A mass flow controller comprising,
    a base;
    a main flow line (i) comprising a bypass, and (ii) adapted to receive a fluid flowing through the main flow line at a flow rate;
    a thermal sensor including,
        a first capillary tube having,
            an inlet end adapted to receive the fluid from the main flow line upstream of the bypass,
            a first pair of sensing elements adapted to output a first signal, and
            an outlet end adapted to exit the fluid to the main flow line downstream of the bypass;
        a second capillary tube having,
            a first end thermally coupled to one of the base and the first capillary tube proximal the inlet end,
            a second pair of sensing elements adapted to output a second signal, and a second end thermally coupled to one of the base and the first tube proximal the outlet end, wherein the second capillary tube is not adapted to receive and eject the fluid flow from the main flow line; and a differential amplifier adapted to,
  receive the first signal and second signal, and
  output a differential amplifier signal generally proportional to the flow rate of the fluid flowing through the main flow line, wherein, the differential amplifier signal is substantially unaffected by temperature gradients.

14. The mass flow controller of claim 13 wherein,
the second capillary tube ends are closed; and
the second capillary tube encloses a fluid.

15. The mass flow controller of claim 13 wherein,
the first signal is generally proportional to a first flow rate with a zero drift portion; and
the second signal is generally proportional to the zero drift portion of the first flow rate.

16. The mass flow controller of claim 13 wherein, the second pair of sensing elements substantially oppose the first pair of sensing elements.

17. The mass flow controller of claim 13 wherein, a change in temperature across the first pair of sensing elements caused by a thermal gradient is cancelled by a change in temperature across the second pair of sensing elements caused by the thermal gradient.

18. The mass flow controller of claim 13 further comprising a bridge circuit wherein the first pair of sensing elements comprise one leg of the bridge circuit and the second pair of sensing elements comprise another leg of the bridge circuit.

19. The mass flow controller of claim 13 wherein, the second signal comprises a zero offset flow signal.

20. The mass flow controller of claim 13 further including,
a control module; and
a control valve.

* * * * *